United States Patent Office 2,814,636
Patented Nov. 26, 1957

2,814,636

ORGANOPHOSPHORAMIDE N-OXIDE PESTICIDE PRODUCT AND PROCESS FOR MAKING IT

Mark A. Stahmann, Thomas C. Allen, and John E. Casida, Madison, and R. Keith Chapman, Verona, Wis., assignors to Wisconsin Alumni Research Foundation, Madison, Wis., a corporation of Wisconsin No Drawing. Application March 13, 1953, Serial No. 342,296

7 Claims. (Cl. 260—461)

The present invention relates to pesticide compositions and processes of preparing the same. More specifically, the present invention is directed to insecticide, miticide and like compositions containing oxidation products of organophosphoramides represented by the following formula:

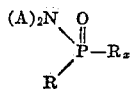

where A represents a lower alkyl group and R is selected from the group consisting of —N(A)₂ and —OA, and R_x represents the groups —OC₆H₄NO₂, halogen (e. g. F, Cl) or

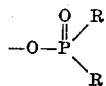

where R as above is selected from the group consisting of N(A)₂ and OA and A represents a lower alkyl group.

The advantages and potentialities of systemic insecticides, i. e. insecticides that enter the sap stream and act on insects feeding on the sap or plant tissues, have been known for some time. One of the first of the "systemics" to be developed was tetrakis (dimethylamido) pyrophosphate which is also referred to in the literature as octamethylpyrophosphoramide. This compound, commonly known as Schradan, may be represented by the following formula:

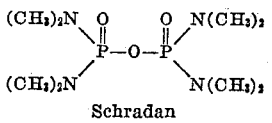
Schradan

Most of the phosphate insecticides act as phosphorylating agents and produce their enzymatic inhibition by linking a phosphate group onto the enzyme. In the case of cholinesterase it is believed to be attached to the enzymatically active site of this protein. A similar phosphorylation reaction has been shown with the proteolytic enzyme chymotrypsin. Schradan and related phosphoramides, however, show very little, if any, inhibition or phosphorylation of either of these enzymes. In this respect they are a striking exception to the general case observed with other organophosphates which are toxic to insects and mammals and show marked enzyme inhibition.

It has been demonstrated that liver slices can convert Schradan into a substance which inhibits cholinesterase. It has also been demonstrated that plants, insects and bacteria can effect a similar conversion. More recently we have noted that the substance formed from Schradan also inhibits the esterase activity of crystalline chymotrypsin and that the conversion by animal and plant tissues increases the enzyme inhibitory activity by about a million times. In carrying out investigations in an attempt to determine the nature of the biological change that brings about such an enormous increase in activity, we discovered that valuable pesticide compositions can be prepared by chemical oxidation of the organophosphoramides. The following example is illustrative.

Example

To 0.05 molar potassium permanganate in aqueous solution containing more than 0.05 molar barium chloride, e. g. 5–10% excess, is added 0.05 molar (3 equivalents) of purified octamethylpyrophosphoramide. The resulting reaction mixture is then incubated for about 3 hours at 37° C. The reaction mixture containing the oxidized products is next extracted with an equal volume of chloroform, the chloroform extract dried, and then distilled below about 30° C. to remove the solvent. The resulting residue consists of oxidized products which still maintain their pyrophosphate structure. This reaction can be carried out with varying amounts of permanganate or similar or equivalent oxidizing agent to yield products of varying stability and biological activity. Our investigations indicate that the toxicity of the individual organophosphates depends on the lability or chemical reactivity of the anhydride bond and on the effect of the other groups on the ability of the compound to penetrate into the plant or insect, mite or the like.

With further investigation it was found that as Schradan is oxidized with increasing amounts of oxidizing agents such as permanganate, that there is a very rapid increase in the cholinesterase inhibition, followed by a decrease on further oxidation. With chymotrypsin, however, it was found that the increase in inhibition is not as rapid, and that it continues to increase throughout the oxidation. Analyses of the oxidized mixtures revealed that formaldehyde liberated by boiling the oxidized products in 2.4 N HCl, is also characterized by an initial rapid increase followed by a decrease in a manner similar to the cholinesterase inhibition curve. This shows that the organically bound formaldehyde in the oxidized products is associated with cholinesterase inhibition. While any of the oxidized mixtures containing products in various stages of oxidation may be employed in the preparation of effective pesticide compositions, investigations have shown that preferred products may be obtained by controlled oxidation and specifically by stopping the reaction approximately at or near the peak of cholinesterase inhibition, i. e. at least at about the time the cholinesterase inhibition starts to decrease. This may be readily done by assaying samples of the reaction mixture for cholinesterase inhibitory activity as the oxidation proceeds and discontinuing oxidation when the highest inhibitory activity is attained. After this has been determined under specific reaction conditions, assays need not be made for each batch preparation as long as the reaction conditions remain the same. In practice it has been found preferable after the process has been standardized, to stop the oxidation just prior to reaching the peak of the cholinesterase inhibition curve. When this is done the reaction mixture in addition to toxic products also contains a high percentage of partially oxidized products that are readily and rapidly converted in situ to highly toxic products by both the plant and the insect. Various degrees of oxidation, however, may produce preferred products or mixtures for use on particular insects or plants. As this may be readily ascertained by preliminary test, the present invention thus provides means for producing "tailor made" pesticide compositions for any particular purpose or use.

Any oxidizing agent may be employed in the process of the present invention and optimum conditions for any particular reaction can be readily ascertained. In addition to potassium permanganate, for example, other oxidizing agents that may be used to convert the relatively inactive organo-phosphoramides to oxidized products having potent pesticide properties include chlorine, bromine water, ozone, potassium dichromate, sodium hypochlorite, anodic oxidation (electrolytic) etc. The oxidation should be carried out around the neutral point (pH 6.5–7.5) in order to avoid hydrolyzing or otherwise degrading the active oxidized products. The pH of the reaction mixtures may be adjusted as required by addition of alkali or acid.

In addition to Schradan which contains four dialkylamino groups, the following are illustrative organophosphoramide compounds falling within the scope of the present invention that may be converted to potent oxidized products as indicated above.

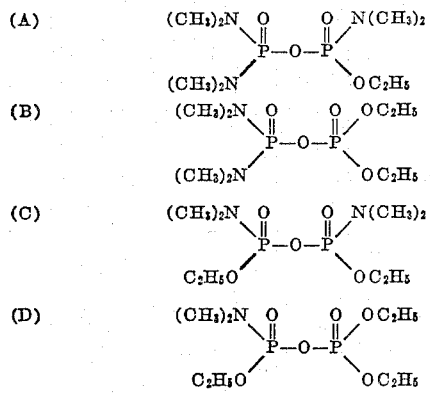

The methyl and ethyl groups may be replaced by other alkyl groups to form various dialkylamino and alkoxy groups where the alkyl group in each case is a lower alkyl such as $CH_3$, $C_2H_5$, $C_3H_7$, etc. Compounds having methyl amino groups are of the preferred type as they yield products readily absorbed by plants. Other illustrative compounds include bis(dimethylamino)-p-nitrophenyl phosphate and bis(dimethylamino)-fluorophosphine oxide. These inactive dialkylamino phosphoramide compounds like Schradan are activated by chemical oxidation.

While the present invention is not limited by theoretical explanations, it is believed that the amide nitrogen is first converted to a new type of chemical structure for which we propose the name phosphoramide N-oxide. The structure of this quaternary compound may be illustrated as follows:

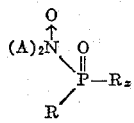

where A is a lower alkyl group, and R and $R_x$ represent groups specified above. The properties of the phosphoramide N-oxides resemble those of amine oxides as both may be decomposed by treatment with acid to yield an aldehyde and a secondary amine or phosphoramide. Chemical oxidation, however, is complicated and with further oxidation other products are formed. The reaction mixtures in all cases are complex being made up of various types of oxidized products. The phosphoramide N-oxides, however, have a structure somewhat similar to acetylcholine in that they have a quaternary nitrogen atom and it may be that these oxidized products in particular compete with the acetylcholine for cholinesterase. Cholinesterase is a very essential enzyme since it serves to decompose acetylcholine, a chemical which may be lethal if allowed to accumulate.

The oxidized organophosphoramide products of the present invention have potent contact and systemic insecticidal and miticidal activity. They are effective, for example, against aphids, mites, leafhoppers, fleabeetles, fruit flies, mosquito larva, cockroaches, etc. For application in a dusting operation, they are mixed with solid powdered or pulverized inert inorganic materials such as clay and the like. A composition made up of finely powdered clay and about 0.1 to 10% by weight of the oxidized products is an illustrative example. For application in a spraying operation, the oxidized products may be dispersed or dissolved in liquids. An aqueous emulsion containing small amounts of xylene and a wetting agent and about 0.5 to 5% by weight of the oxidized products is an illustrative example. Aqueous solutions containing about 0.1 to 10% by weight of the oxidized products may also be employed. The oxidized products in addition may be mixed with Freon type materials and used in aerosol bombs, etc. They may also be applied before planting by soaking or coating the seeds, tuberous cuttings or other propagative plant parts with a preparation containing the oxidized organophosphoramide products. The insecticide is then absorbed and serves to protect the young growing plant from insects at a period where protection with ordinary insecticides is difficult. In addition, the oxidized products of the present invention are particularly effective when applied to the soil in which the plants are grown. The roots then absorb the oxidized products and confer protection to the entire plant. This makes it possible to apply the insecticide to the soil by spraying, dusting or mixed with fertilizer, irrigation, or transplant water. This is often a very convenient method for application and gives a prolonged period of protection. Any of the pesticide or insecticide carriers carrying a minor amount of the active oxidized products may be employed as long as the carriers are relatively inert, i. e. substantially neutral. This is important as the oxidized organophosphoramide products of the present invention are not stable in the presence of strong alkalies and acids.

The use of the chemically oxidized products of the present invention in place of Schradan and related organophosphoramide products possesses many advantages. Schradan type products, for example, are not directly toxic to insects or mites and a considerable amount of time is required for biological conversion to toxic products. This time lag is avoided by the present invention as the oxidized mixtures are toxic to insects and mites and also contain partially oxidized products which are very rapidly converted to highly toxic products by the plant or insect or mite. Some types of plants have also been found that absorb only a portion of available Schradan type products, and others to be poor in conversion of absorbed product to toxic products. In practice, for example, it has been found that relatively large amounts of absorbed Schradan remain in most plants as an unmetabolized unused residue. Aside from waste of material, the residue remaining in the plant poses a problem of residual toxicity in the event the plant is eaten by mammals. These disadvantages and problems are largely avoided by the use of the oxidized organophosphoramides of the present invention.

We claim:

1. A pesticide composition containing as an essential ingredient an organophosphoramide N-oxide product represented by the following formula:

where A represents a lower alkyl group, R is selected from the group consisting of $N(A)_2$ and OA, and $R_x$ represents a member of the group consisting of fluorine, chlorine, p-nitrophenoxy, and $OP(O)(R)_2$ where R is as defined above.

2. The composition of claim 1 where $R_x$ is

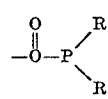

3. A pesticide composition comprising an inert, solid, powdered insecticidal adjuvant as a carrier for the pesticide containing as its active ingredients about 0.1 to 10% by weight of the phosphoramide N-oxide products of claim 2.

4. A pesticide composition comprising an inert, liquid, insecticidal adjuvant as a carrier for the pesticide containing as its active ingredients about 0.1 to 10% by weight of the phosphoramide N-oxide products of claim 2.

5. The process of increasing insecticidal activity of an organophosphoramide represented by the formula:

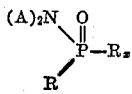

where A represents a lower alkyl group, R is selected from the group consisting of $N(A)_2$ and $OA$, and $R_x$ represents a member of the group consisting of fluorine, chlorine, p-nitrophenoxy, and $OP(O)(R)_2$ where R is as defined above, which comprises chemically oxidizing the phosphoramide to convert at least a portion thereof to a quaternary phosphoramide N-oxide compound represented by the formula in claim 1 where A, R and $R_x$ are as defined therein, said oxidation being such as to provide oxidized products with increased cholinesterase activity and a resulting reaction mixture which yields an aldehyde when treated with acid.

6. The process of preparing insecticide compositions which comprises oxidizing tetrakis (dimethylamido) pyrophosphate in a substantially neutral oxidizing reaction mixture, containing the oxidation until a sample of the reaction mixture when assayed for cholinesterase inhibition activity shows approximately maximum inhibition, then stopping the oxidation and recovering the oxidized products from the reaction mixture.

7. The process of claim 6 wherein oxidation is stopped just prior to the time a sample of the reaction mixture when assayed for cholinesterase inhibition activity shows maximum inhibition.

References Cited in the file of this patent

UNITED STATES PATENTS

| | | |
|---|---|---|
| 2,487,859 | Dickey et al. | Nov. 15, 1949 |
| 2,502,966 | Kosolapoff | Apr. 4, 1950 |
| 2,587,549 | Trementozzi | Feb. 26, 1952 |
| 2,613,224 | Paulshoch | Oct. 7, 1952 |